(12) United States Patent
Refalo et al.

(10) Patent No.: US 6,572,263 B1
(45) Date of Patent: Jun. 3, 2003

(54) DRY CALORIMETER

(75) Inventors: Lee A. Refalo, Aiken, SC (US); Henry W. Randolph, Augusta, GA (US)

(73) Assignee: Westinghouse Savannah River Company, Aiken, SC (US)

( * ) Notice: Subject to any disclaimer, the term of this patent is extended or adjusted under 35 U.S.C. 154(b) by 0 days.

(21) Appl. No.: 09/673,439

(22) PCT Filed: Apr. 14, 1998

(86) PCT No.: PCT/US98/07736

§ 371 (c)(1),
(2), (4) Date: Apr. 2, 2001

(87) PCT Pub. No.: WO99/53281

PCT Pub. Date: Oct. 21, 1999

(51) Int. Cl.⁷ ............................................. G01K 17/00
(52) U.S. Cl. ............................ 374/31; 374/33; 374/34
(58) Field of Search ............................ 374/31, 33, 34; 422/51; 436/147

(56) References Cited

U.S. PATENT DOCUMENTS

| | | | | |
|---|---|---|---|---|
| 2,800,793 A | * | 7/1957 | Oliver | 374/33 |
| 3,266,307 A | * | 8/1966 | Winter | 374/33 |
| 3,267,728 A | * | 8/1966 | Solomons | 374/34 |
| 3,365,944 A | * | 1/1968 | Hoagland et al. | 374/34 |
| 3,665,762 A | | 5/1972 | Domen | 71/190 R |
| 3,675,465 A | * | 7/1972 | Sommer et al. | 374/34 |
| 3,798,003 A | | 3/1974 | Ensley et al. | 25/253 R |
| 3,813,937 A | | 6/1974 | Fletcher et al. | 73/190 R |
| 3,869,914 A | | 3/1975 | Koehler et al. | 73/190 R |
| 3,899,918 A | | 8/1975 | Privalov et al. | 73/15 B |
| 3,995,485 A | * | 12/1976 | Beyer et al. | 374/33 |
| 4,095,453 A | | 6/1978 | Woo | 73/15 B |
| 4,178,800 A | * | 12/1979 | Thomann | 374/33 |
| 4,255,961 A | | 3/1981 | Biltomen et al. | 73/15 B |
| 4,350,446 A | | 9/1982 | Johnson | 374/13 |
| 4,785,178 A | * | 11/1988 | Lynch et al. | 250/479.1 |
| 4,993,842 A | | 2/1991 | Morimoto et al. | 374/39 |
| 5,067,820 A | | 11/1991 | Donohoue et al. | 374/31 |
| 5,185,122 A | | 2/1993 | Poppendiek et al. | 376/272 |
| 5,335,993 A | * | 8/1994 | Marcus et al. | 374/33 |
| 5,876,118 A | * | 3/1999 | Vogel | 374/33 |

* cited by examiner

Primary Examiner—Diego Gutierrez
Assistant Examiner—Mirellys Jagan
(74) Attorney, Agent, or Firm—McNair Law Firm, P.A.

(57) ABSTRACT

A calorimeter for use in assaying radioactive sources. The calorimeter includes a constant temperature shield and a series of temperature matched shields in which temperature control is provided by electrical resistance, thereby eliminating the need for a water jacket, while providing improved temperature and heat flow control. A labyrinth plug which eliminates air exchange between the sample well and the outside is used to seal the calorimeter. A computer control system monitors the calorimeter to reduce errors introduced by system fluctuations.

16 Claims, 4 Drawing Sheets

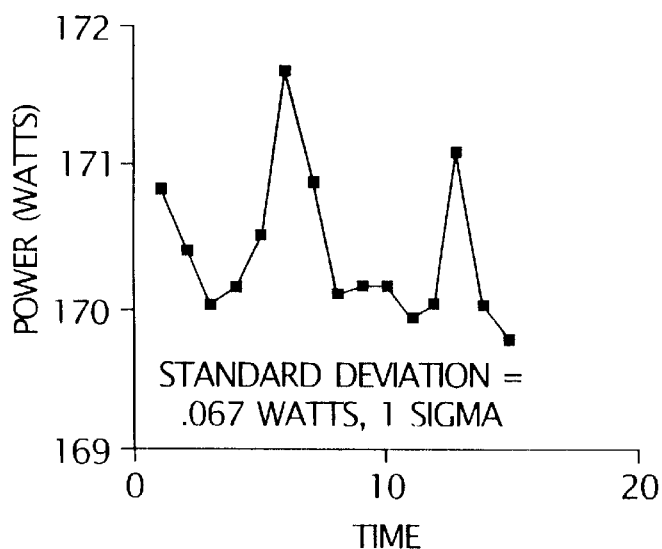
FIG. 4A
(PRIOR ART)
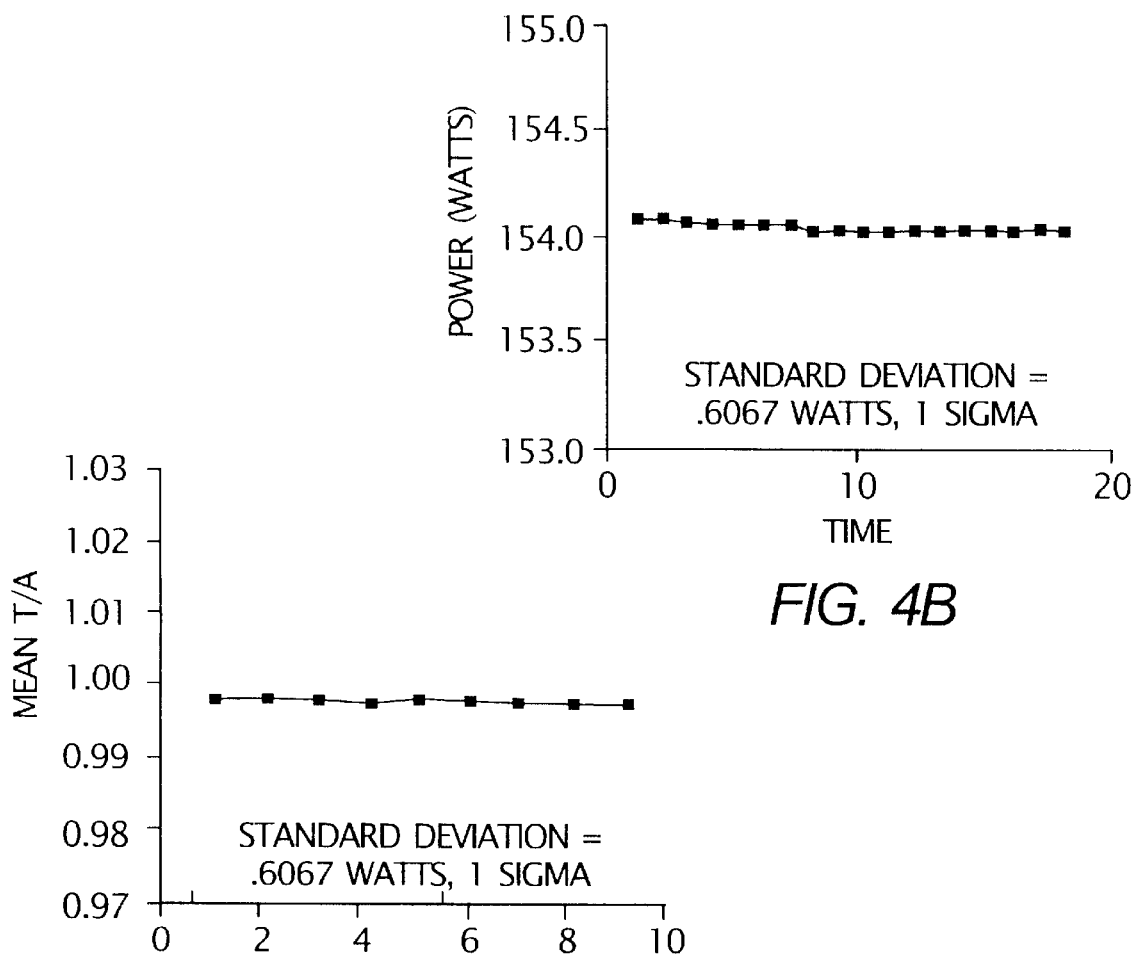
FIG. 4B
FIG. 4C

DRY CALORIMETER

CROSS REFERENCE TO RELATED APPLICATION

This application is a national phase application of PCT/US98/07736 filed Apr. 14, 1998.

FIELD OF THE INVENTION

The present invention relates to a calorimeter apparatus and calorimetry process for making highly accurate measurements of power generated by steady state sources, such as radioactive materials.

BACKGROUND

Calorimeters often are used to assay steady state sources, such as radioactive materials, by measuring the thermal power emitted by the source. To assay a radioactive source, the source is placed in a constant temperature environment and its thermal output is measured by non-destructive techniques, such as power replacement calorimetry. The isotopic mass is computed from the measured power through known watts/gram constants for each of the isotopes.

Calorimetry is the most accurate method of accounting nuclear materials because the accuracy of the measurement is not affected by the size, shape, or form of the material being assayed. For example, the material resulting from the manufacture of nuclear weapons often is found in odd shapes and sizes, making other assaying techniques difficult or impractical. Likewise, beta emitters, such as tritium, which may be packaged in many forms, are very difficult to quantify using chemical or nuclear counting methods.

In order to obtain precise results, however, the calorimeter must control the flow of heat so that no external heat enters the system and no heat escapes from the sample without being detected. As a result, calorimeters typically have a complex arrangement of heat shields which insulate the sample from external heat sources and direct the emitted heat through a desired path. Typically, calorimeters have used water jackets as heat shields due to the desirable insulating and temperature variation control characteristics of water. Water jackets, however, present several problems. For example, water jackets substantially complicate maintenance procedures for the calorimeters. Moreover, mixing water and radioactive sources creates the possibility of dangerous chemical reactions, nuclear criticalities and other problems. Thus, a water leak in a calorimeter can create significant safety hazards to workers in the vicinity of the calorimeter.

Calorimeters must have an opening through which the sample is deposited in the calorimeter for measurements to be taken. Typically, these openings are sealed with a lid of some form. Conventional lids can adversely affect the accuracy of the measurements by allowing air and heat to flow in and out of the test chamber. Very hot or cold samples can dramatically change the air pressure in the test chamber, causing air to "puff" in or out of the calorimeter. Inadvertent exchanges of air such as this can cause significant errors in the measurements taken with the calorimeter due to unaccounted and unmeasured heat losses associated with the exchange.

Power replacement calorimeters measure the heat output of the sample by determining the amount of energy required to hold constant the temperature of the calorimeter once the sample has been introduced. The quality of the measurement depends on knowing when the output signal from the calorimeter is stable and no longer affected by heat sinks or sources from mechanical structures or changes in environmental conditions. Conventional calorimeters rely solely on the calorimeter output signal to determine stability. The calorimeter output signal typically is drawn from a very limited region of the overall structure of the calorimeter. As a result, inaccuracies occur when stability is mistakenly assumed. The shielding, closures and control systems used in conventional calorimeters may cause safety hazards and introduce significant inaccuracies in the measurements taken with those calorimeters.

SUMMARY OF THE INVENTION

The present invention is a heat-flow calorimeter made up of a heat-conducting rod with a test chamber affixed to one end and a heat sink affixed to the other. The heat sink is maintained at a constant temperature and the heat liberated or absorbed by the test sample is measured by determining the amount of energy that must be introduced into the system to maintain a constant temperature differential across the length of the heat-conducting rod.

A zero heat transfer envelope is used to insulate the unit and prevent heat from "leaking" into or out of the calorimeter. The envelope is made of three heat shield systems. The first shield is thin, highly conductive, and affixed to the measurement chamber. The sample is enclosed in the measurement chamber; thus, allowing the first shield to effectively match the sample temperature. The second shield is relatively massive compared to the first shield and its temperature is matched to that of the first shield. The third shield surrounds the second shield and its temperature is controlled to a constant value; thus, protecting the zero heat transfer envelope from ambient temperature variations.

Each of the shields are heated with distributed electrical resistance heaters rather than a water jacket. This eliminates problems that typically arise from water jacketed heat shields, such as maintenance problems, potentially dangerous interactions between the samples and water, and corrosion. Temperature matching of the shields significantly improves calorimeter sensitivity and accuracy.

A labyrinth-sealed plug, which is made up of alternating layers of foam insulation and metallized plastic film, is used to seal the test chamber. This allows easy removal of the sample while providing a stable barrier to heat exchange. While a "tight" seal might allow air to "puff" out of the chamber as a result of heat generated pressure, the multiple layers of the labyrinth seal allows room for the air to move without allowing it to leave the chamber.

The control system includes an automatic stability routine which determines when the calorimeter is stable. The program continually monitors the elements of and sensors distributed throughout the calorimeter to detect any changes or drifts in input or output. This data is used to accurately assess stability. Data from temperature control points and power and cooling devices are analyzed to see that all control points are at the prescribed set points and that the values are not drifting over time. Various approaches, including proportional-integral-derivative (PID), state-space/PID and fuzzy-logic controls have been used to implement this strategy. This type of dynamic control improves the accuracy of the calorimeter.

The calorimeter may have between 5 to 12 control loops. For each of the control loops, the temperature and power data are acquired by a digital multimeter. This data is requested by and transmitted to the control computer. The control computer processes the data through the software control algorithms and stability checks. The control algorithms produce a digital number which is processed through a digital-to-analog converter board. The analog output is fed to linear power supplies which are configured in an operational amplifier mode. The power supply output feeds the heaters and coolers which in turn affect the system temperatures.

The overall accuracy of the new calorimeter is enhanced by the combination of these elements together with other features such as the use of an extremely sensitive heat sink; encapsulation of the entire device, including the heat-conducting rod, with insulation; direct temperature measurements using thermistors; and minimal attach points to the zero heat transfer envelope and heat removal system.

Accordingly, it is an object of the present invention to provide a calorimeter which does not use a water jacket.

A further object of the invention is to provide a closure for a calorimeter that eliminates inadvertent exchanges of air between the test chamber and the outside environment.

Another object of the invention is to provide a calorimeter having a control system which substantially improves the precision and repeatability of measurements.

Other objects, features, and advantages of the present invention will become apparent with reference to the remainder of the written portion and the drawings of this application, which are intended to exemplify and not to limit the invention.

BRIEF DESCRIPTION OF THE DRAWINGS

FIG. 4 is a chart comparing the baseline repeatability of conventional calorimeters and a calorimeter in accordance with the present invention.

DETAILED DESCRIPTION

Figure 1:
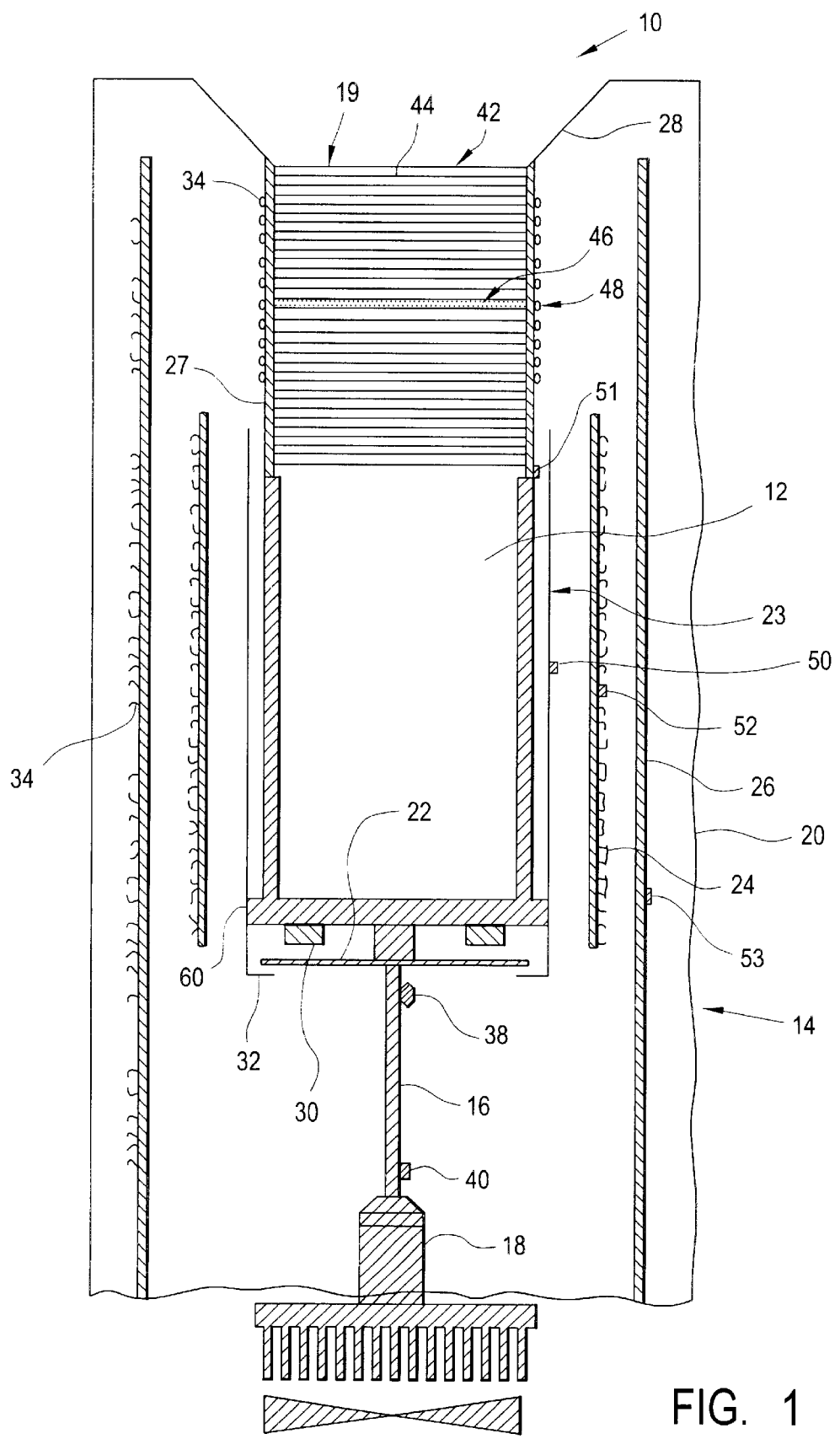
FIG. 1 is a side cross-section of a calorimeter in accordance with the present invention.

FIG. 1 shows a calorimeter 10 in accordance with the present invention. Calorimeter 10 includes sample well 12, zero heat transfer envelope 14, conductive rod 16 and heat pump system 18.

Sample well 12 is a cylindrical shell that is enclosed at one end. The open end is affixed to zero transfer heat envelope 14 in a manner that allows samples to be deposited in sample well 12. Sample well 12 may be made of highly conductive material, such as copper. Other metals with desirable heat transfer properties may be selected as desired and appropriate. For instance, it may be desirable to select a material with less favorable heat transfer characteristics, such as aluminum or stainless steel, to avoid undesirable or dangerous chemical reactions between the sample and sample well 12.

Zero transfer heat envelope 14 includes outer insulation shell 20, measurement chamber bottom heat shield 22, first heat shield 23, second heat shield 24 and third heat shield 26. Outer insulation shell 20 is a cylindrical shell that is closed at one end and open at the other. The open end includes an inwardly protruding lip 28 to which sample well 12 is affixed. This arrangement allows a sample to be introduced into sample well 12 for testing purposes. Sample well 12 may be affixed to outer insulation shell 20 by welding, use of adhesives or any other appropriate affixing means. Outer insulation shell 20 may be made of any material of a strength and thickness sufficient to support the assembly.

Chamber bottom heat shield 22 is a plate affixed to the bottom of sample well 12. Shield 22 is made of a relatively thin conductive material, such as copper, although other appropriate materials may be selected. In the illustrative embodiment, shield 22 is about 0.125 inch thick, although other thicknesses may be selected as desired and appropriate. Resistance heaters 30 are affixed to the bottom 60 of sample well 12. Resistance heaters 30 may be high wattage, wire wound heaters and may have an aluminum casing that allows for a relatively large surface contact to the base 60 of sample well 12. Other types of heaters may be used as desired and appropriate. Resistance heaters 30 are controlled to maintain the top of the heat removal rod 16 at a constant temperature.

Heat shield 23 is a cylindrical shield affixed to the bottom of sample well 12. Shield 23 is made of a relatively thin, conductive material, such as copper. In the illustrative embodiment, shield 23 is about 0.125 inch thick. Other appropriate materials and thicknesses may be selected. Because heat shield 23 has only minimal attachments at the base of sample well 12, heat shield 23 may be passively temperature matched to sample well 12, allowing it to maintain a very uniform temperature representative of temperature of sample well 12. Lip 32 may be provided at the base of heat shield 23 for additional shielding.

Second heat shield 24 is an open cylinder that has no attachments. Heat shield 24 is made of a high thermal conductivity material such as copper and is more massive than the first heat shield 23. In the illustrative embodiment, heat shield 24 has a wall thickness of about 0.125 inch or greater. Other appropriate materials and thicknesses may be selected. Heat shield 24 is wrapped with resistive heater wire 34. Wire 34 is controlled such that heat shield 24 matches the temperature of first heat shield 23. In the illustrative embodiment, wire 34 is about 0.01 inch to 0.02 inch in diameter and has a resistance of about 0.25 to 2 ohms/foot. Windings of wire 34 may be separated from about zero to 0.25 inch. Other wires and windings may be used as appropriate. Because wire 34 is wrapped all around shield 24, uniform heating and thus, uniform temperature is achieved.

Heat shield 27 is an open cylinder that connects the outer insulation shell 20 to sample well 12. Heat shield 27 is a low thermal conductivity material such as stainless steel or PVC and has a wall thicknesses as low as about 0.063 inch. Of course, other materials and thicknesses may be selected as appropriate. The upper section of heat shield 27 is wrapped with resistive heater wire 34. The heater wire is controlled such that the upper portion of heat shield 27 matches the top of the measurement chamber 12 (in the region of thermistor 51). In the illustrative embodiment, wire 34 is about 0.01 inch to 0.02 inch in diameter and has a resistance of about 0.25 to 2 ohms/foot. Windings of wire 34 may be separated from about zero to 0.25 inch. Other wires and windings may be used as appropriate. Because wire 34 is wrapped all around shield 27, uniform heating and thus, uniform temperature is achieved.

Third heat shield 26 is an open cylinder which surrounds shield 24, but extends all the way to the bottom of insulation shell 20. Heat shield 26 is made of high thermal conductivity material such as copper or aluminum. Heat shield 26 may be 0.25" thick or greater. Other materials and thicknesses may be selected as appropriate. Third heat shield 26 is wrapped with resistive heater wire 34 in a manner similar to shield 24.

The temperature of third heat shield 26 is controlled to a constant temperature which virtually eliminates the effects of room temperature variations from affecting zero heat transfer envelope 14.

Optionally, additional shielding (not shown) can be added to the system by affixing bottom and top plates to shield 26, affixing upper and bottom lips to heat shield 24, and adding a cylindrical heat shield surrounding the heat removal rod 16. Additional thermal control can be added by providing active thermal control in the plug 19 with the use of resistive wire and/or element heaters (not shown), and by enclosing the entire system in a thermally controlled environment (not shown).

Heat removal rod 16 joins constant temperature the sample well 12 and heat pump system 18 and provides a heat flow path therebetween. Heat removal rod 16 is made of a highly conductive material, such as copper, although other appropriate materials may be used. The length and diameter of the heat removal rod are selected to accommodate the required measurement heat with a 10 degree C. differential from one end of rod 16 to the other. For example, the diameter of rod 16 may be from about 0.125 inch to over two inches and the length may be from several inches to over ten inches.

Heat pump system 18 may be any temperature control device capable of providing sufficient heat removal for the system. In the event simple thermal control is required, simple fan/heat fin arrangements may be used. If a higher quality of temperature control is required, more sophisticated heat pump systems may be used. For example, to achieve the optimum thermal control, a Peltier heat pump may be used. Using the Peltier device, control of the base of the heat removal rod 16 may achieve a standard deviation of less than 15 microdegrees C.

Plug 19 closes the opening of calorimeter 10, and in particular the opening of sample well 12. Plug 19 prevents errors from heat flow and air transport into and out of the calorimeter. Plug 19 uses multiple layers of foam insulation 42 of slightly smaller diameter than the opening of the calorimeter. These layers are separated by thin, metallized plastic film layers 44 having diameters slightly larger than the opening of the calorimeter. Foam insulation 42 provides insulation against conductive heat flow, and the metallized plastic film layers 44 provide resistance to radiative heat flow. Because the film layers 44 have a larger diameter than the opening, this arrangement also provides a labyrinth seal to prevent air flow into or out of calorimeter 10. While air can move a small distance (from one pair of film layers 44 to the next) in order to equalize pressure inside and outside calorimeter 10, air inside calorimeter 10 cannot flow the full distance of plug 19 and reach the outside. The high flexibility of film layers 44 allows the plug to be installed and removed easily, since air can force film layers 44 open as the plug moves.

Heat flow through the plug 19 is further reduced by placing a layer 46 of conductive metal at the center of plug 19. Layer 46 contacts the temperature controlled heat shield 27 through which plug 19 passes. The temperature of heat shield 27 is controlled to match the temperature of the top of sample well 12, thereby reducing the heat flow to the top of sample well 12. This layer 46 and heat shield 27 arrangement greatly reduces the effect of room temperature changes on the calorimeter 10.

Thus, calorimeter 10 contains sample well 12 connected through a small area (constant temperature heat shield 22) to one end of rod 16, which is highly thermally conductive. The other end of the rod 16 is connected to a precisely controlled heat removal device, heat pump 18. Sample well 12 is surrounded by a zero transfer envelope 14 containing a number of matching temperature shields (shields 23, 24, 27 and 46) and at least one constant temperature shield 26. The close match in temperature of the various shields reduces the heat flow into and out of the sample well to an extremely small and stable amount. An arrangement of this type, used in conjunction with an inner heat shield, can reduce heat flow variations below twenty microwatts for a large (650 $cm^2$) area. Temperature control can be maintained to plus or minus fifty microdegrees C.

The heat output from the sample is determined by measuring the power flowing through the conductive rod 16 and is measured using the power replacement method. Equilibrium power is first established (without a sample) by applying constant, accurately measured power to heaters 30, and the temperature at each end of the rod is stabilized by control of the heat pump 18. When a set of equilibrium values has been established, a sample is placed in well 12 and calorimeter 10 is automatically controlled by varying the power of heaters 30 to maintain thermistor 38 at a fixed temperature value and varying heat pump 18 to maintain a fixed temperature at thermistor 40. The reduction in power (from the equilibrium value) needed to maintain thermistor 38 at the fixed temperature will equal the amount of power added by the sample material. Calorimeter 10 can be read directly in power units without the need for conversions.

In order to obtain accurate calorimeter measurements, it is necessary to be certain that conditions in calorimeter 10 are stable. Thus, thermistors 38 and 40 are monitored to determine whether the temperatures thereof are at their set points and stable with time. Also, temperature sensors 51 and 48, located on the top of the sample well 12 and the second heat shield 27, respectively, are monitored to match the temperature of the second heat shield 28 to that of the sample well 12, and stable with time. Also, temperature sensors 50 and 52, located on the first and second heat shields, respectively, are monitored to match the temperature of the second heat shield 24 to that of the first heat shield 23, and stable with time. The temperature of the third, constant temperature shield is monitored by sensor 53 to determine if it is at its set point and stable with time.

Computer control and monitoring of the temperature parameters sensed by thermistors 38 and 40 and sensors 48, 50–53 is used. When all temperatures are stable and at their set points, power reduction is measured and its stability over time is assessed. "Stable" temperatures may be defined as those having variations of less than some predetermined range. For example, in the illustrative embodiment, stable temperatures vary by less than about 100 microdegrees C. for temperature sensors in zero heat transfer envelope 14 and heat removal rod 16 and between about 0.5 to 1.5 millidegrees C. for sensor 53. Of course, the criteria for stability may be selected based on the degree of accuracy desired. Thus, larger variations may be acceptable if less accurate results are acceptable.

Setpoints for the calorimeter 10 may be established to keep the sample well 12 at approximately room temperature to avoid significant sample temperature changes, thus reducing the measurement time. The setpoint for the base of heat removal rod 16 may be established at about 10 degrees C. cooler than room temperature; however, this value is often changed to accommodate different maximum power measurement capability. Setpoints for heat shield 26 may be established a few degrees C. warmer then the maximum room temperature expected to allow it to control on a year round basis.

Once stable power data are obtained, power readings are obtained to calculate an average over time. Temperature and power data are continuously monitored to ensure that stability is not disrupted during final measurements. If the stability is upset, the data is not used in the power averaging function. Data is only used when adequate stability is restored. Each of the temperature sensors are monitored, compared with its respective setpoint, and compared with its previous value. Additionally, the power data is monitored and generally compared with its previous value; however, other algorithms such as computing the power standard deviation have been used. Once the data is within the stability criteria, the software stability counter is started. On each count of the stability counter, the current calorimeter power is averaged with previous stable power values. When the stability counter reaches a preset number the calorimeter is determined stable and the measurement may be taken. The preset number for the stability counter is determined during calorimeter setup and may vary due to precision requirements for the system; although, ten is the normal value selected.

Figure 2A:
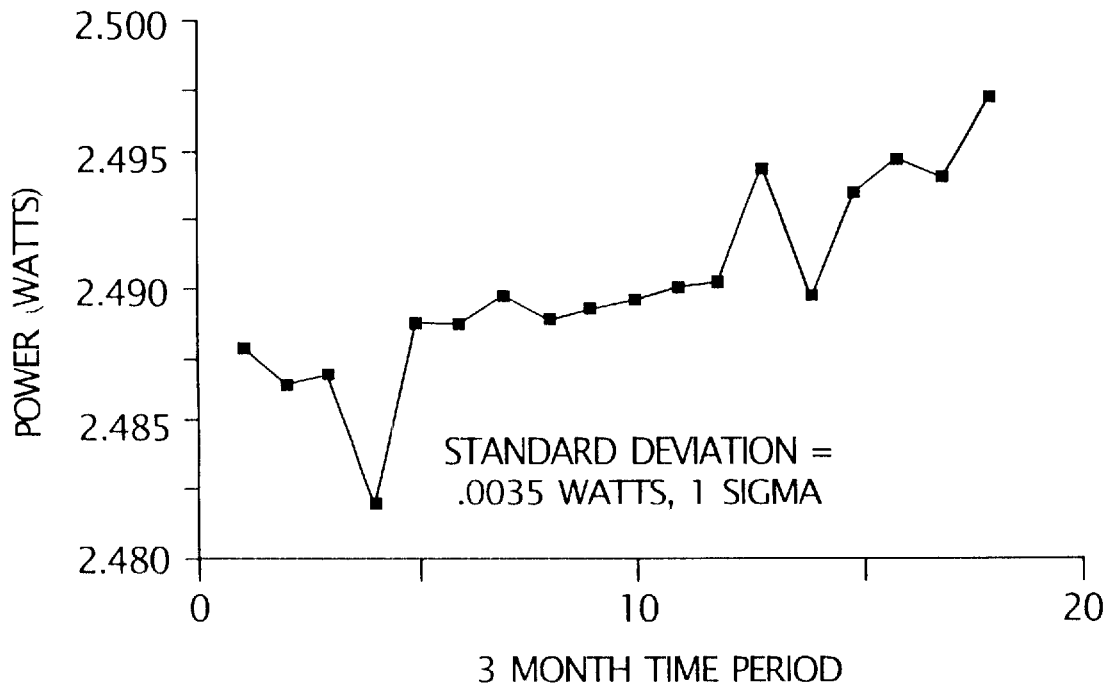
FIG. 2 is a chart comparing the baseline repeatability of conventional calorimeters and a calorimeter in accordance with the present invention.
Figure 2B:
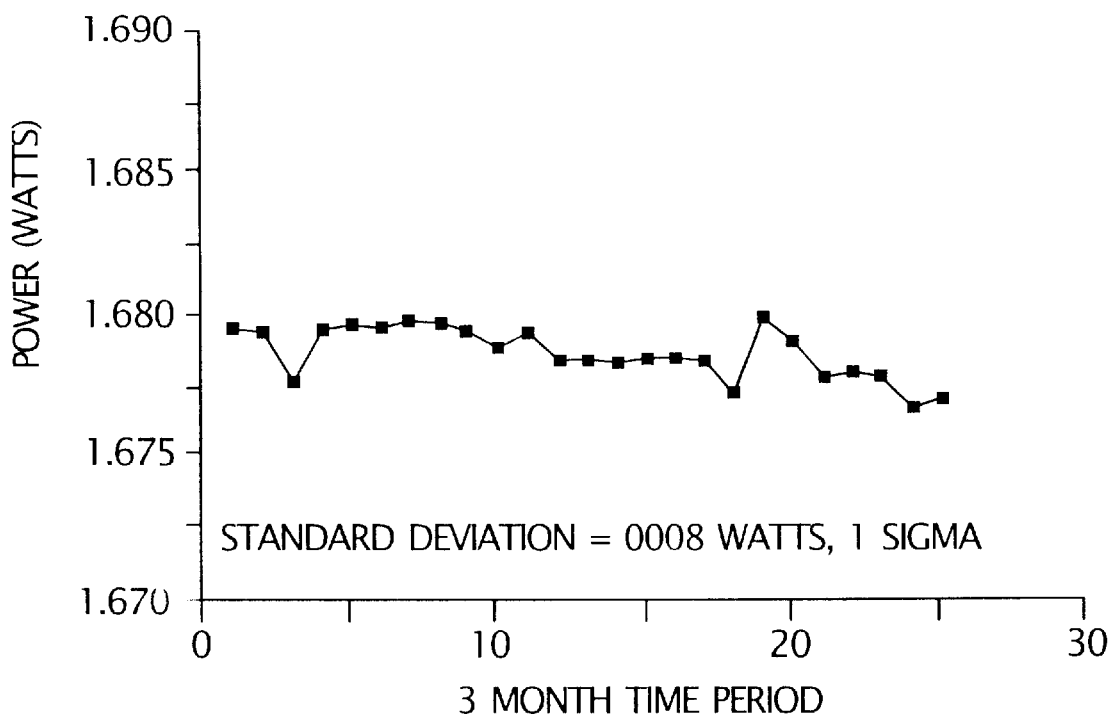
Figure 3A:
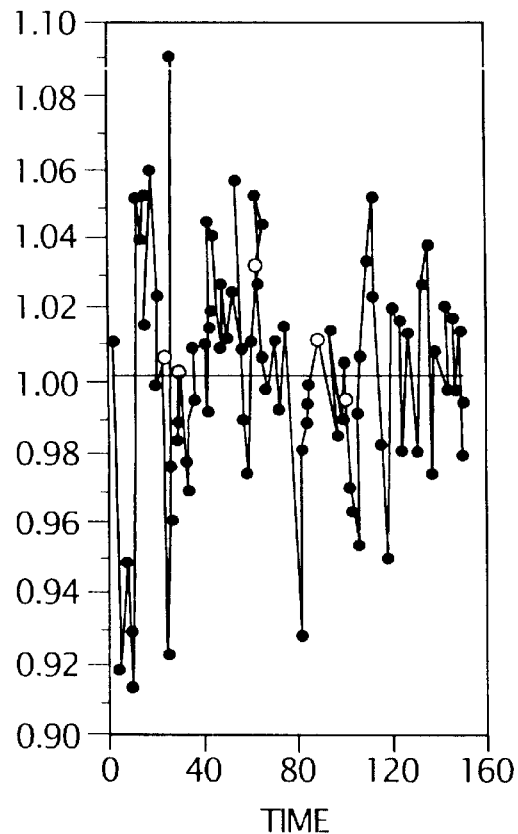
FIG. 3 is a chart comparing the measurement precision of conventional calorimeters and a calorimeter in accordance with the present invention.
Figure 3B:
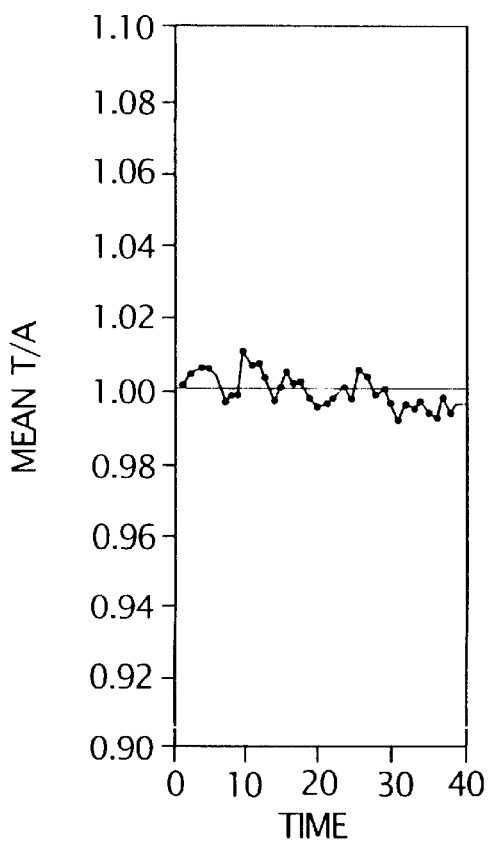

Referring to FIGS. 2–4, calorimeter 10 provides substantially improved performance over conventional calorimeters. FIGS. 2 and 4 are graphs comparing the baseline repeatability of measurements taken by a conventional calorimeter (graphs A) and calorimeter 10 (graphs B). FIG. 3 shows graphs comparing the measurement precision of a conventional calorimeter (graph A) and calorimeter 10 (graph B). FIGS. 2 and 3 compare the performance of low wattage calorimeters using a 0.1 watt radiometric standard over a period of three months. FIG. 4 compares the performance of high wattage calorimeters using a 140 watt radiometric standard. Graph C of FIG. 4 shows the measurement precision of a high wattage version of calorimeter 10 which demonstrates a standard deviation of 0.018%, 1 sigma. In contrast, conventional calorimeters typically report a standard deviation of about 0.25%, 1 sigma.

The foregoing is provided for purposes of illustration, explanation, and description of embodiments of the present invention. Modifications and adaptations to these embodiments will be apparent to those skilled in the art and may be made without departing from the scope or spirit of the invention.

What is claimed is:

1. A calorimeter comprising:
   a) a zero heat transfer envelope including first and second heat shields and having no water jacket;
   b) a sample well affixed within the envelope for receiving a sample whose heat output is to be measured, said sample well having a side wall and a bottom wall; wherein said first heat shield is carried by the sample well and is passively temperature matched thereto but is spaced apart from the side wall of the sample well and has a heat sensor attached thereto; and wherein said second heat shield surrounding the sample well and first heat shield, said second shield being actively temperature matched to the first heat shield and being relatively massive compared to the first heat shield;
   c) a conductive rod having a first end affixed to the sample well;
   d) a heat pump affixed within the envelope and to a second end of the rod;
   e) a labyrinth plug removably inserted in an opening of the envelope for allowing pressure changes in the sample well without heat transfer occurring;
   f) a heater for heating said sample well;
   g) first and second thermistors for detecting the temperature at spaced apart points on said rod, said thermistors being spaced apart from said sample well bottom and side walls and from said heat pump;
   h) a monitoring and control system in communication with said sensor, thermistors, heater, and heat pump for controlling the heater and heat pump to maintain a fixed temperature difference between each thermistor whereby the decrease in power required by the heater to maintain a predetermined temperature level when a sample is inserted into the well indicates the heat generated by the sample.

2. The calorimeter of claim 1 including a heater wire surrounding the second heat shield.

3. The calorimeter of claim 1 in which the heat pump is a peltier heat pump.

4. The calorimeter of claim 1 further comprising a plurality of sensors affixed within the envelope.

5. The calorimeter of claim 1 wherein the labyrinth plug comprises a layer of conductive metal affixed intermedially in the layrinth plug in a position such that, when the plug is inserted in the opening, the layer of conductive metal coincides with a temperature controlled section in the opening.

6. The calorimeter of claim 1 in which the envelope further comprises an actively controlled constant temperature or third heat shield surrounding the second heat shield.

7. The calorimeter of claim 6 further comprises a heater wire surrounding the constant temperature heat shield.

8. The calorimeter of claim 1 wherein:
   a) the first thermistor is affixed to the rod adjacent to the first end but spaced apart from said sample well heater; and
   b) the second thermistor is affixed to the rod adjacent to the second end but spaced apart from said heat pump.

9. The calorimeter of claim 8 wherein the monitoring and control system is in communication with the sensors and thermistors.

10. A method for controlling and monitoring the measurement precision of a calorimeter comprising the steps of:
   a) providing a sample receiving well within the calorimeter, said well being provided with a heater and being surrounded by first and second heat shields; said second shield being more massive than the first and being thermally unattached thereto;
   b) providing a plurality of temperature sensors;
   c) distributing the sensors throughout the calorimeter; and then adding heat by means of said heater to establish an equilibrium temperature level in said calorimeter;
   d) placing a heat generating sample in the sample well;
   e) sealing the calorimeter with a labyrinth plug;
   f) monitoring the temperature sensors and heater data to detect instabilities introduced by said sample; and
   g) discarding temperature measurements taken during periods of instability.

11. The method of claim 10 in which the step of discarding measurements is performed when temperatures sensed by the sensors fall outside a first predetermined range.

12. The method of claim 11 in which the step of discarding measurements is performed when temperatures sensed by a sensor affixed to a constant temperature shield falls outside of a second predetermined range.

13. A method for assaying a radioactive source comprising the steps of:
   a) sealing the source in a sample well having a labyrinth closure plug and being surrounded by first and second heat shields, said first and second heat shields being thermally unattached;

b) applying power at a constant level to a heater affixed to the sample well;

c) stabilizing the temperature of a heat removal rod affixed to the sample well;

d) passively matching the temperatures of the first heat shield to the sample well;

e) actively matching the temperature of the second heat shield to that of the first heat shield;

f) actively stabilizing the temperature of a constant heat shield in which the mechanism for actively stabilizing the temperatures does not use water;

g) sealing the source in a sample well with a labyrinth plug;

h) measuring the heat output from the radioactive source by measuring the reduction from said constant power level necessary to maintain said constant heat shield at a constant temperature.

14. The method of claim 13 further comprising the steps of:

i) monitoring the temperatures of the heat shields and the heat removal rod.

15. The method of claim 14 further comprising the steps of:

j) discarding data recorded when temperatures of the first heat shield, second heat shield or heat removal rod fall outside of a first predetermined range.

16. The method of claim 15 further comprising the steps of:

k) discarding data recorded when temperature of the constant temperature heat shield falls outside of a second predetermined range.

* * * * *